United States Patent
Zhang

(10) Patent No.: US 11,739,239 B2
(45) Date of Patent: Aug. 29, 2023

(54) THERMALLY CROSSLINKABLE COMPOSITION

(71) Applicant: Sunstar Engineering Inc., Osaka (JP)

(72) Inventor: Yanmei Zhang, Osaka (JP)

(73) Assignee: Sunstar Engineering Inc., Osaka (JP)

( * ) Notice: Subject to any disclaimer, the term of this patent is extended or adjusted under 35 U.S.C. 154(b) by 891 days.

(21) Appl. No.: 16/490,127

(22) PCT Filed: Jul. 10, 2018

(86) PCT No.: PCT/JP2018/025961
§ 371 (c)(1),
(2) Date: Aug. 30, 2019

(87) PCT Pub. No.: WO2019/013185
PCT Pub. Date: Jan. 17, 2019

(65) Prior Publication Data
US 2020/0002584 A1    Jan. 2, 2020

(30) Foreign Application Priority Data

Jul. 11, 2017  (JP) ................. 2017-135200

(51) Int. Cl.
| | |
|---|---|
| *C09J 7/35* | (2018.01) |
| *C09J 11/08* | (2006.01) |
| *C09J 153/02* | (2006.01) |
| *C09J 123/16* | (2006.01) |
| *C09J 123/08* | (2006.01) |
| *C09J 123/18* | (2006.01) |
| *C08K 5/28* | (2006.01) |
| *C09J 123/14* | (2006.01) |
| *C08K 5/01* | (2006.01) |
| *C08K 5/00* | (2006.01) |

(52) U.S. Cl.
CPC ....... *C09J 123/0869* (2013.01); *C08K 5/0025* (2013.01); *C08K 5/01* (2013.01); *C08K 5/28* (2013.01); *C09J 7/35* (2018.01); *C09J 11/08* (2013.01); *C09J 123/08* (2013.01); *C09J 123/142* (2013.01); *C09J 123/147* (2013.01); *C09J 123/16* (2013.01); *C09J 123/18* (2013.01); *C09J 153/02* (2013.01); *C09J 2301/304* (2020.08); *C09J 2301/312* (2020.08); *C09J 2301/408* (2020.08); *C09J 2301/414* (2020.08); *C09J 2423/006* (2013.01); *C09J 2423/04* (2013.01); *C09J 2423/10* (2013.01); *C09J 2423/16* (2013.01); *C09J 2425/00* (2013.01); *C09J 2451/00* (2013.01); *C09J 2493/00* (2013.01)

(58) Field of Classification Search
None
See application file for complete search history.

(56) References Cited

U.S. PATENT DOCUMENTS

| | | | |
|---|---|---|---|
| 8,173,744 B2 * | 5/2012 | Ishikura | C09D 5/002 525/76 |
| 9,359,536 B2 | 6/2016 | Murai et al. | |
| 2002/0115788 A1 | 8/2002 | Okamoto et al. | |
| 2015/0361315 A1 * | 12/2015 | Karjala | C08F 255/00 525/71 |
| 2017/0354042 A1 * | 12/2017 | Tsuruta | H05K 3/3457 |
| 2017/0362427 A1 * | 12/2017 | Furukawa | C08J 5/04 |
| 2019/0119530 A1 * | 4/2019 | Miyazawa | C08K 5/11 |

FOREIGN PATENT DOCUMENTS

| | | |
|---|---|---|
| EP | 2444467 A1 | 4/2012 |
| JP | 02-92977 A | 4/1990 |
| JP | 08-504226 A | 5/1996 |
| JP | 2000-198940 A | 7/2000 |
| JP | 2001-226535 A | 8/2001 |
| JP | 2003-094524 A | 4/2003 |
| JP | 2008-127450 A | 6/2008 |
| JP | 2011-001444 A | 1/2011 |
| JP | 2016-089090 A | 5/2016 |
| WO | 94/12581 | 6/1994 |
| WO | WO-2015186733 A1 * | 12/2015 ............. B32B 27/32 |

OTHER PUBLICATIONS

Machine translation of WO 2015186733 A1 (Year: 2015).*
Extended European Search Report and written opinion for corresponding European application No. 18831788.7 dated Mar. 3, 2021.
International Search Report for corresponding Application No. PCT/JP2018/025961, dated Oct. 9, 2018.
International Preliminary Report on Patentability for corresponding Application No. PCT/JP2018/025961 dated Jan. 23, 2020 and English translation.

* cited by examiner

*Primary Examiner* — Frank D Ducheneaux
(74) *Attorney, Agent, or Firm* — Renner, Otto, Boisselle & Sklar, LLP

(57) ABSTRACT

The present invention relates to a thermally crosslinkable composition comprising an acid-modified polymer A having a melting point of 110 to 150° C. and a crystallization temperature of 50 to 90° C., an acid-modified polymer B having a melting point of 30 to 110° C. and a crystallization temperature of lower than 50° C., a tackifier resin, and a curing agent, wherein the thermally crosslinkable composition has a crystallization temperature of 30 to 70° C.

15 Claims, No Drawings

THERMALLY CROSSLINKABLE COMPOSITION

CROSS-REFERENCE TO RELATED APPLICATIONS

This application is a national phase of International Application No. PCT/JP2018/025961 filed Jul. 10, 2018, which claims priority to Japan Application No. 2017-135200 filed Jul. 11, 2017.

TECHNICAL FIELD

The present patent application claims priority based on JP-2017-135200 (filed Jul. 11, 2017) under the Paris Convention, and the contents described in the above application is incorporated herein by reference in their entirety.

The present invention relates to a thermally crosslinkable composition, and a hot melt type adhesive, a film adhesive and an adhesive for adherent surface material, which contain the thermally crosslinkable composition, as well as an adherent surface material, and an automotive interior component and an architectural interior material which contain the adherent surface material.

BACKGROUND ART

Heretofore, thermally crosslinkable compositions have been used for bonding a surface material with a substrate in automotive interior components.

Patent Document 1 proposes a one-pack type crosslinkable composition containing a thermoplastic polymer having a carboxylic acid group or its anhydride group.

Patent Document 2 proposes a one-pack type thermally crosslinkable adhesive containing a mixture of a polyolefin having a carboxylic acid or its anhydride group and having a softening point of 80 to 140° C. with a styrene-containing thermoplastic elastomer having a carboxylic acid or its anhydride group and having a softening point of 80° C. or higher.

Patent Document 3 proposes an adhesive composition containing a mixture of at least two thermoplastic polymers having a difference of 30° C. or higher in softening point.

PRIOR ART DOCUMENTS

Patent Documents

Patent Document 1: JP-A-2000-198940
Patent Document 2: JP-A-2003-94524
Patent Document 3: JP-A-2008-127450

SUMMARY OF THE INVENTION

Problems to be Solved by the Invention

However, it was found that when a surface material coated with a thermally crosslinkable composition described in Patent Document 1 or 2 was heated to a predetermined temperature and then bonded to a substrate, a blended latent curing agent functioned to express a heat resistance required for automotive interior components, but a period from after the coating of the surface material until the bonding of the surface material with the substrate i.e. a shelf life after the coating was insufficient. In addition, Patent Document 3 had a problem that the shelf life after the coating was sufficiently long, but a heat resistant temperature after the bonding was low because of the absence of latent curing agent, and the applicable portions were limited.

Thus, an object of the present invention is to provide a thermally crosslinkable composition in which initial adhesiveness with the substrate and heat resistance of the thermally crosslinkable composition applied to the surface material are preferable, and a shelf life after the coating is sufficient.

Solutions to the Problems

As a result of intensive studies on initial adhesiveness and heat resistance of the thermally crosslinkable composition, the present inventor has found that a thermoplastic polymer having a relatively high melting point and crystallization temperature and a thermoplastic polymer having a relatively low melting point and crystallization temperature are used in combination and blended as a base polymer, so that the crystallization temperature of the thermally crosslinkable composition is relatively low, the adhesiveness is expressed even at a relatively low temperature while maintaining excellent heat resistance, wettability to a substrate is improved, and thereby an initial adhesiveness of the thermally crosslinkable composition applied to the surface material to the substrate can be ensured.

In addition, the inventor has found that a thermoplastic polymer having a melting point and a crystallization temperature higher than those of conventionally used thermoplastic polymers can be used by using the aforementioned thermoplastic polymer having the relatively low melting point and crystallization temperature. As a result, it has become possible to obtain an excellent heat resistance even when an amount of the curing agent in the thermally crosslinkable composition is relatively small, and therefore the shelf life after the coating can also be improved by reducing the amount of the curing agent.

The present invention includes the followings.

[1] A thermally crosslinkable composition comprising an acid-modified polymer A having a melting point of 110 to 150° C. and a crystallization temperature of 50 to 90° C., an acid-modified polymer B having a melting point of 30 to 110° C. and a crystallization temperature of lower than 50° C., a tackifier resin, and a curing agent, wherein the thermally crosslinkable composition has a crystallization temperature of 30 to 70° C.

[2] The thermally crosslinkable composition according to [1] comprising 30 to 200 parts by mass of the acid-modified polymer B based on 100 parts by mass of the acid-modified polymer A, and 20 to 200 parts by mass of the tackifier resin and 0.2 to 3 parts by mass of the curing agent based on 100 parts by mass of a total amount of the acid-modified polymers A and B.

[3] The thermally crosslinkable composition according to [1] or [2], wherein a content of the tackifier resin having an acid value of 5 or less is 20 to 100% by mass based on 100% by mass of a whole tackifier resin.

[4] The thermally crosslinkable composition according to [3], wherein the tackifier resin having an acid value of 5 or less is selected from the group consisting of rosin types, terpene types and petroleum resin types.

[5] The thermally crosslinkable composition according to any one of [1] to [4], wherein the curing agent is a solid polyamine compound having a melting point of 150° C. or higher.

[6] The thermally crosslinkable composition according to [5], wherein the solid polyamine compound having a melting point of 150° C. or higher is a hydrazide type polyamine.

[7] The thermally crosslinkable composition according to any one of [1] to [6], further comprising an acid-unmodified thermoplastic resin.

[8] The thermally crosslinkable composition according to [7], wherein the acid-unmodified thermoplastic resin is an acid-unmodified styrene-containing thermoplastic elastomer.

[9] The thermally crosslinkable composition according to any one of [1] to [8], further comprising a solvent.

[10] A hot melt type adhesive comprising the thermally crosslinkable composition according to any one of [1] to [9].

[11] A film adhesive comprising the thermally crosslinkable composition according to any one of [1] to [9].

[12] An adhesive for adherent surface material, wherein the adhesive comprises the thermally crosslinkable composition according to any one of [1] to [9].

[13] An adherent surface material comprising the adhesive according to [12].

[14] An automotive interior component comprising the adherent surface material according to [13] and a polyolefin substrate.

[15] An architectural interior material comprising the adherent surface material according to [13] and the polyolefin substrate.

Effects of the Invention

The present invention makes it possible to obtain excellent initial adhesiveness with a substrate, heat resistance, and a sufficiently long shelf life after the coating, and therefore the present invention can be suitably used as a hot melt type, film type or pre-coating type adhesive excellent in bondability and heat resistance for bonding an architectural interior material or an automotive interior component requiring heat resistance.

EMBODIMENTS OF THE INVENTION

The thermally crosslinkable composition according to the present invention contains an acid-modified polymer A having a melting point of 110 to 150° C. and a crystallization temperature of 50 to 90° C. (hereinafter, also referred to as "acid-modified polymer A"), and an acid-modified polymer B having a melting point of 30 to 110° C. and a crystallization temperature of lower than 50° C. (hereinafter, also referred to as "acid-modified polymer B").

As the acid-modified polymer A and the acid-modified polymer B, thermoplastic polymers having a carboxylic acid group or its anhydride group can be used.

Examples of the thermoplastic polymers having a carboxylic acid group or its anhydride group include an olefin-based polymer, a butadiene-based polymer, an ester-based polymer, a carbonate-based polymer, an urethane-based polymer, an amide-based polymer, and the like which have a carboxylic acid group or its anhydride group. Above all, the olefin-based polymer having a carboxylic acid group or its anhydride group is preferable.

Examples of the olefin-based polymer having a carboxylic acid group or its anhydride group include an olefin-based polymer modified by introducing an unsaturated dibasic acid e.g. maleic acid, fumaric acid, citraconic acid, mesaconic acid, (meth)acrylic acid, and the like, or their anhydrides. The (meth)acrylic acid is a generic term for acrylic acid and methacrylic acid.

Examples of the olefin-based polymer include a homopolymer or a copolymer of at least one monomer selected from the group consisting of ethylene, propylene and butene, and a copolymer thereof with other copolymerizable monomer.

Examples of other copolymerizable monomers include vinyl acetate, acrylate, styrene, butadiene, isoprene, and the like. Examples of the acrylate include methyl(meth)acrylate, ethyl(meth)acrylate, propyl(meth)acrylate, butyl (meth) acrylate, and the like. The (meth)acrylate is a generic term for acrylates and methacrylates.

Examples of the olefin-based polymer include a polypropylene, a propylene-1-butene-ethylene copolymer, a propylene-1-butene copolymer, a styrene-ethylene/1-butene-styrene copolymer, an ethylene-vinyl acetate copolymer, an ethylene-acrylate copolymer, a propylene-acrylate copolymer, a propylene-acrylate-ethylene copolymer, a propylene-1-butene-ethylene-acrylate copolymer, and the like.

When the acid-modified polymer A is an acid-modified olefin-based polymer, the olefin-based polymer preferably contains 20 to 90% by mass of a propylene-based structural units, 1 to 60% by mass of 1-butene-based structural units, and 0.1 to 10% by mass of an ethylene-based structural units, more preferably 60 to 80% by mass of propylene-based structural units, 10 to 25% by mass of 1-butene-based structural units, and 1 to 5% by mass of ethylene-based structural units based on the olefin-based polymer.

When the acid-modified polymer B is an acid-modified olefin-based polymer, the olefin-based polymer preferably contains 55 to 95% by mass of propylene-based structural units, 5 to 40% by mass of acrylate and/or 1-butene-based structural units, and 0 to 5% by mass of ethylene-based structural units based on the olefin-based polymer. When the amount of the ethylene-based structural units is large, the bondability is lowered, and when the amount of the 1-butene-based structural units is small, the initial adhesiveness cannot be obtained, and for this reason, when the acid-modified polymer B is an acid-modified olefin-based polymer, the olefin-based polymer more preferably contains 70 to 90% by mass of propylene-based structural units and 10 to 30% by mass of acrylate and/or 1-butene-based structural units, and no ethylene-based structural units.

Each acid content in the acid-modified polymer A and the acid-modified polymer B is preferably 0.1 to 10% by mass, more preferably 0.5 to 5% by mass, even more preferably 1 to 4% by mass based on the mass of each acid-modified polymer. When the acid contents in the acid-modified polymers A and B are within the above range, there is a tendency that sufficient crosslinkability is easy to obtain.

The acid-modified polymer A has a melting point of 110 to 150° C., preferably 115 to 140° C., more preferably 120 to 135° C. When the acid-modified polymer A has a melting point of lower than 110° C., there is a tendency that sufficient heat resistance is hard to obtain. When the acid-modified polymer A has a melting point of higher than 150° C., there is a tendency that stickiness at a low temperature and coatability of the crosslinkable composition are hard to obtain and initial adhesiveness with the substrate is hard to obtain. Furthermore, when the acid-modified polymer A has a melting point of higher than 150° C., there is a tendency that workability is lowered due to an excessively high heating temperature during coating, and in a case of using a solvent, selectivity for the type and content of the solvent is lowered.

The acid-modified polymer A has a crystallization temperature of 50 to 90° C., preferably 55 to 85° C., more preferably 60 to 80° C., even more preferably 60 to 70° C. When the acid-modified polymer A has a crystallization temperature of lower than 50° C., there is a tendency that sufficient heat resistance is hard to obtain. When the acid-modified polymer A has a crystallization temperature of higher than 90° C., there is a tendency that initial adhesiveness with the substrate is hard to obtain.

The acid-modified polymer B has a melting point of 30 to 110° C., preferably 40 to 100° C., more preferably 50 to 95° C., even more preferably 60 to 90° C. When the acid-modified polymer B has a melting point of lower than 30° C., there is a tendency that sufficient heat resistance is hard to obtain, and blockability is easily lowered. When the acid-modified polymer B has a melting point of higher than 110° C., there is a tendency that the initial adhesiveness with the substrate is hard to obtain.

The acid-modified polymer B has a crystallization temperature of lower than 50° C., preferably 0 to lower than 50° C., more preferably 5 to lower than 50° C., even more preferably 8 to lower than 50° C. When the acid-modified polymer B has a crystallization temperature of 50° C. or higher, there is a tendency that the initial adhesiveness with the substrate is hard to obtain.

In relation to the melting point, a sample was heated to 200° C. at a rate of 10° C./min, and a peak top temperature at an endothermic peak observed by a differential scanning calorimeter (DSC) was defined as the melting point. In relation to the crystallization temperature, a sample was heated to 200° C. and cooled at a rate of 10° C./min, and a peak top temperature at an exothermic peak observed by the differential scanning calorimeter (DSC) was defined as the crystallization temperature.

The acid-modified polymer A has a weight average molecular weight (Mw) of preferably 10,000 to 1,000,000, more preferably 30,000 to 500,000, even more preferably 50,000 to 100,000. When the weight average molecular weight (Mw) of the acid-modified polymer A is within the above range, there is a tendency that proper melting point and crystallization temperature are easy to obtain.

The acid-modified polymer B has a weight average molecular weight (Mw) of preferably 10,000 to 1,000,000, more preferably 30,000 to 500,000, even more preferably 50,000 to 200,000. When the weight average molecular weight (Mw) of the acid-modified polymer B is within the above range, there is a tendency that proper melting point and crystallization temperature are easy to obtain.

The weight average molecular weight Mw was calculated in terms of polystyrene by measurement using gel permeation chromatography.

A content of the acid-modified polymer B in the thermally crosslinkable composition is preferably 30 to 200 parts by mass, more preferably 40 to 190 parts by mass, even more preferably 50 to 180 parts by mass, particularly preferably 60 to 170 parts by mass based on 100 parts by mass of the acid-modified polymer A. When the content of the acid-modified polymer B is within the above range, there is a tendency that both initial adhesiveness with the substrate and heat resistance can be sufficiently obtained.

The total content of the acid-modified polymer A and the acid-modified polymer B in the thermally crosslinkable composition is preferably 10 to 80 parts by mass, more preferably 20 to 70 parts by mass, even more preferably 25 to 65 parts by mass, particularly preferably 30 to 60 parts by mass based on the solid content of the thermally crosslinkable composition. When the contents of the acid-modified polymers A and B are within the above ranges, there is a tendency that initial adhesiveness with the substrate and heat resistance are easy to obtain.

The thermally crosslinkable composition further contains a tackifier resin.

The tackifier resin has an acid value of preferably 5 or less, more preferably 4 or less, even more preferably 3 or less. When the acid value is 5 or less, there is a tendency that the shelf life of the crosslinkable adhesive after coating is easy to extend.

The tackifier resin may be either liquid or solid at ambient temperature. When the tackifier resin is solid at ambient temperature, the tackifier resin has a softening point of preferably 90 to 130° C., more preferably 95 to 125° C., even more preferably 95 to 110° C.

Examples of the tackifier resin having an acid value of 5 or less include a rosin resin, a rosinate, a petroleum resin, a coumarone-indene resin, a phenol resin, a terpenephenol resin, a xylene resin, as well as their hydrogenated products, disproportionated products, partially hydrogenated modified products, and the like. Among them, the rosin type, the terpene type and the petroleum resin type are preferable, and the disproportionated rosin resin is more preferable. When using the disproportionated rosin resin, there is a tendency that preferable initial adhesiveness with a substrate and/or surface material as well as sufficient heat resistance are easy to obtain.

The thermally crosslinkable composition contains the tackifier resin of preferably 20 to 200 parts by mass, more preferably 30 to 150 parts by mass, even more preferably 40 to 100 parts by mass based on 100 parts by mass of the total amount of the acid-modified polymers A and B.

When the thermally crosslinkable composition contains the tackifier resin having an acid value of 5 or less, a content of the tackifier resin having the acid value of 5 or less in the thermally crosslinkable composition is preferably 20 to 100% by mass, more preferably 30 to 90% by mass, even more preferably 40 to 80% by mass based on 100% by mass of the whole tackifier resin.

The thermally crosslinkable composition further contains a curing agent.

The curing agent is preferably a latent curing agent. Examples of the latent curing agent include a solid polyamine compound.

The solid polyamine compound has a melting point of preferably 80° C. or higher, more preferably 100° C. or higher, even more preferably 120° C. or higher, particularly preferably 150° C. or higher. The solid polyamine compound has a melting point of preferably 230° C. or lower, more preferably 200° C. or lower.

Examples of the solid polyamine compound having a melting point of 80 to 230° C. include an aromatic polyamine having a melting point of 80 to 230° C. such as 4,4'-diaminodiphenylmethane, 2,4'-diaminodiphenylmethane, 3,3'-diaminodiphenylmethane, 3,4'-diaminodiphenylmethane, 2,2'-diaminobiphenyl, 3,3'-diaminobiphenyl, o-phenylenediamine, 2,3-tolylenediamine, 2,4-tolylenediamine, 2,6-tolylenediamine, 3,4-tolylenediamine, 1,5-naphthalenediamine, 1,3-bis(3-aminophenoxy) benzene, 4,4'-diaminodiphenylsulfone, 3,3'-diaminodiphenylsulfone, and 2,4-diamino-6-phenyl-1,3,5-triazine; an aliphatic polyamine having a melting point of 80 to 230° C. such as 1,14-tetradecanediamine and 1,16-hexadecanediamine; and a hydrazide type polyamine such as 1,3-bis(hydrazinocarboethyl)-5-isopropylhydantoin represented by formula (1):

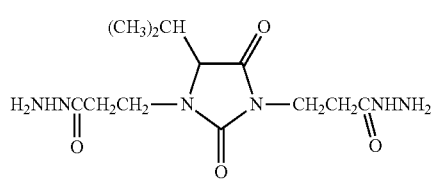

a compound represented by formula (2):

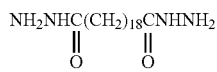

a compound represented by formula (3):

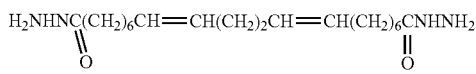

dihydrazide adipate, dihydrazide sebacate, hydrazide dodecanoate, dihydrazide dodecanedioate, dihydrazide isophthalate, and hydrazide salicylate, and the like. Above all, the solid polyamine compound having a melting point of 150° C. or higher such as 1,5-naphthalenediamine, 4,4'-diaminodiphenylsulfone, 3,3'-diaminodiphenylsulfone, 2,4-diamino-6-phenyl-1,3,5-triazine, the compound represented by formula (2), the compound represented by formula (3), dihydrazide adipate, dihydrazide sebacate, hydrazide dodecanoate, dihydrazide dodecanedioate, dihydrazide isophthalate, and hydrazide salicylate are preferable, and the hydrazide type polyamine having a melting point of 150° C. or higher is more preferable.

Also, a solid polyamine compound having a melting point of lower than 80° C. can be used. Examples of the solid polyamine compound include m-phenylenediamine, 2,5-tolylenediamine, 2,4'-diaminobiphenyl, 1,12-dodecanediamine, 1,10-decanediamine, 1,8-octanediamine, and the like.

Also, as a curing agent, a hydrolyzable reaction product obtained by reacting a diamine having two amino groups or imino groups in one molecule with a carbonyl compound (aldehyde or ketone), a modified amine e.g. an amine adduct obtained by reacting an epoxy resin with an excessive amount of polyamine, and the like can be used.

A content of the curing agent in the thermally crosslinkable composition is preferably 0.2 to 3 parts by mass, more preferably 0.4 to 2.5 parts by mass, even more preferably 0.6 to 2 parts by mass, particularly preferably 0.8 to 1.5 parts by mass based on 100 parts by mass of the total amount of the acid-modified polymers A and B.

If necessary, the thermally crosslinkable composition can contain a thermoplastic resin.

Examples of the thermoplastic resin include an acrylic resin, a vinyl resin, a polyamide resin, a polyester resin, polyolefin, polyurethane, a styrene copolymer, an amorphous poly-α-olefin, an ethylene-vinyl acetate copolymer, and the like.

Examples of the styrene copolymer include a styrene-butadiene copolymer, a styrene-acrylonitrile-butadiene copolymer, a styrene-butadiene-butylene-styrene copolymer, a styrene-ethylene-butylene-styrene copolymer, a styrene-butadiene-styrene copolymer, a styrene-isoprene copolymer, a styrene-isoprene-styrene copolymer, a styrene-ethylene-propylene-styrene copolymer, a styrene-ethylene-butene-styrene copolymer, a styrene-ethylene-ethylene-propylene-styrene copolymer, as well as their acid-modified products and hydrogenated products, and the like. In the styrene copolymer, a ratio of unit structures composed of styrene is preferably 10 to 60%, more preferably 15 to 50%, even more preferably 20 to 40% of the styrene copolymer.

The thermoplastic resin is preferably an acid-unmodified thermoplastic resin. The acid-unmodified thermoplastic resin refers to a thermoplastic resin having an acid value of 0. The acid-unmodified thermoplastic resin is preferably an acid-unmodified product of the aforementioned styrene copolymer, more preferably an acid-unmodified styrene-containing thermoplastic elastomer.

The thermoplastic resin has a melt flow rate (MFR) of preferably 0.1 to 30 g/10 min, more preferably 1 to 20 g/10 min, even more preferably 5 to 15 g/10 min, at 200° C. and under a load of 5 kg.

The thermoplastic resin has a softening point of preferably 60° C. or higher, more preferably 65° C. or higher, even more preferably 70° C. or higher.

A content of the thermoplastic resin in the thermally crosslinkable composition is preferably 1 to 100 parts by mass, more preferably 5 to 50 parts by mass, even more preferably 10 to 30 parts by mass based on 100 parts by mass of the total amount of the acid-modified polymers A and B. When the thermoplastic resin content in the thermally crosslinkable composition is within the above range, there is a tendency that components in the thermally crosslinkable composition are easy to compatibilize, and the film formability is easy to obtain.

If necessary, the thermally crosslinkable composition can contain a solvent for the purpose of improving the coatability. Examples of the solvent include organic solvents such as toluene, xylene, benzene, 1,1,1-trichloroethane, methylene chloride, cyclohexane, and alkylcyclohexane.

When the thermally crosslinkable composition contains the solvent, a content of the organic solvent in the thermally crosslinkable composition is not particularly limited as long as the effect of the present invention is not inhibited, and the content is e.g. 50 to 90% by mass based on the thermally crosslinkable composition.

If necessary, the thermally crosslinkable composition can contain various additives e.g. a colorant, a stabilizer, a viscosity modifier, an antifoamer, or the like in such an amount that the effect of the present invention is not inhibited.

The thermally crosslinkable composition according to the present invention has a crystallization temperature of 30 to 70° C. When the crystallization temperature is lower than 30° C., there is a tendency that blockability after coating is hard to sufficiently obtain. When the crystallization temperature is higher than 70° C., there is a tendency that the initial adhesiveness with the substrate or the surface material is readily lowered. The thermally crosslinkable composition according to the present invention has a crystallization temperature of preferably 30 to 65° C., more preferably 40 to 60° C.

The thermally crosslinkable composition according to the present invention can be obtained by stirring and mixing the acid-modified polymer A, the acid-modified polymer B, a tackifier and a curing agent, if necessary, together with optional components such as a thermoplastic resin, a solvent and/or an additive, preferably while heating.

When the thermally crosslinkable composition according to the present invention does not contain the solvent, the thermally crosslinkable composition can be used as a hot melt type adhesive. In addition, the thermally crosslinkable composition according to the present invention can be applied on a film to produce a film adhesive containing the thermally crosslinkable composition according to the present invention.

The adhesive for adherent surface material containing the thermally crosslinkable composition according to the present invention can be applied on surfaces of the substrate and the surface material using e.g. a spray gun, a die coater, a roll coater, or the like, preferably while heating. A coating film of the adhesive can be formed on the surface material e.g. by a process that the adhesive for surface material according to the present invention is sprayed or applied with a roll coater, a comma coater, or the like on the bonding face of the surface material so as to have a thickness of 5 to 500 μm, and then the solvent is dried at ordinary temperature, or by using a heating drier with a hot air or the like. The adherent surface material obtained in such a manner can be directly subjected to a subsequent forming step, or can be stored at room temperature to 60° C. for several months until subjected to the forming step.

Examples of the substrate include a film, a sheet, a board, a formed body, and the like, made of a polyolefin such as polypropylene, polyethylene and an ethylene-propylene copolymer, wood, paper, metal, nylon, polyester, polycarbonate, polyurethane, acryl, ABS, or the like. These substrates may be e.g. automotive interior components.

Examples of the surface material include a polyvinyl chloride foam, a polyolefin foam such as polyethylene and polypropylene foams.

In the forming step, the adherent surface material according to the present invention can be bonded with e.g. a substrate obtained by bonding a substrate having a surface temperature maintained at 25 to 90° C. with an adherent surface material having a surface temperature heated to 165 to 220° C. so that the surface temperature of the adherent surface material is 50 to 150° C. For the bonding, pores are formed on the substrate side, and the substrate is vacuumed from the reverse face, so that an effective bonding can be achieved by a vacuum forming method for adherent surface materials.

A content of the solvent in the adherent surface material according to the present invention is preferably 2% by weight or less for preventing fusion during storage in the piled-up state.

The adherent surface material according to the present invention can be bonded with the substrate to form a laminate. The adherent surface material according to the present invention can be suitably used for an architectural interior material such as partition, floor material, cabinet exterior and laminated steel plate, and an automotive interior material such as ceiling, door trim, instrument panel, dash silencer, center console, pillar, ornament, rear parcel and seat.

The automotive interior material may contain the adherent surface material according to the present invention and a polyolefin substrate.

Hereinafter, the present invention will be more specifically explained with reference to examples and comparative examples, but the present invention is not limited to examples and comparative examples at all.

EXAMPLES

[Melting Point]
In relation to the melting point, a sample was heated to 200° C. at a rate of 10° C./min, and a peak top temperature at an endothermic peak observed by a differential scanning calorimeter (DSC) was defined as the melting point.

[Crystallization Temperature]
In relation to the crystallization temperature, a sample was heated to 200° C. and cooled at a rate of 10° C./min, and a peak top temperature at an exothermic peak observed by the differential scanning calorimeter (DSC) was defined as the crystallization temperature.

[Acid Value]
The acid value was determined in accordance with JIS K 0070.

[Thermally Crosslinkable Composition]
An acid-modified polymer, a tackifier resin, a curing agent, and a thermoplastic resin in parts shown in the following Table 1 were added to a solvent, and stirred and dispersed at 80° C. for 2 hours to obtain an adhesive.

[Sample for Bonding Test]
The adhesive was applied on a polyethylene foam surface material so as to have a post-drying thickness of 50 μm, and then dried at 60° C. for 5 minutes. Subsequently, within 1 day after application of the adhesive, the surface material was overlaid on a PP board which had been heated at 80° C. for 2 minutes while heating the surface material to 150° C. or higher using a far-infrared heater, and compressed at 0.5 kg/cm$^2$ for 20 seconds to obtain a laminate (condition 1). Also, a laminate was obtained in the same manner as in condition 1 except for using a surface material which had been stored (storage temperature: 5 to 35° C.) for 6 months after application of the adhesive (condition 2).

[Initial Creep]
Immediately after obtaining the laminate, the laminate was loaded at 200 g/25 mm in 90° direction under an atmosphere at 60° C., and after 5 minutes, a peeling length (mm) was measured.

[Initial Peel Strength]
After 5 minutes of obtaining the laminate, a peel strength (N/25 mm) under 180° peeling was measured.

[Heat Creep Resistance]
After the laminate was left at rest at 20° C. for 24 hours, the laminate was loaded at 200 g/25 mm in 90° direction under an atmosphere at 90° C., and a peeling length (mm) after 24 hours was measured.

TABLE 1

|  | Examples |  |  |  |  |  |  |  | Comparative Examples |  |  |  |  |
|---|---|---|---|---|---|---|---|---|---|---|---|---|---|
|  | 1 | 2 | 3 | 4 | 5 | 6 | 7 | 8 | 1 | 2 | 3 | 4 | 5 |
| Acid-modified polymer 1 | 100 | 120 | 80 | 140 | 80 | 100 | 160 | 60 | — | — | 100 | 200 | — |
| Acid-modified polymer 2 | 100 | 80 | 120 | 60 | 120 | 100 | 40 | 140 | — | — | 100 | — | 200 |
| Acid-unmodified Polymer 1 | — | — | — | — | — | — | — | — | — | 100 | — | — | — |
| Acid-unmodified Polymer 2 | — | — | — | — | — | — | — | — | — | 100 | — | — | — |
| Acid-unmodified Polymer 3 | — | — | — | — | — | — | — | — | 100 | — | — | — | — |
| Acid-unmodified Polymer 4 | — | — | — | — | — | — | — | — | 100 | — | — | — | — |
| Tackifier resin 1 | 100 | — | — | — | — | — | — | — | — | — | — | 100 | — |
| Tackifier resin 2 | — | 100 | 50 | — | 100 | 100 | 100 | 100 | 100 | 100 | 100 | — | 100 |
| Tackifier resin 3 | — | — | 50 | 100 | — | — | — | — | — | — | — | — | — |
| Curing agent | 2 | 2 | 2 | 2 | 5 | 0.5 | 2 | 2 | 2 | 2 | — | 2 | 2 |
| Thermoplastic resin | 50 | 50 | 50 | 50 | 50 | 50 | 50 | 50 | 50 | 50 | 50 | 50 | 50 |
| Solvent | 1000 | 1000 | 1000 | 1000 | 1000 | 1000 | 1000 | 1000 | 1000 | 1000 | 1000 | 1000 | 1000 |

Unit: g

TABLE 2

| | | Examples | | | | | | | | Comparative Examples | | | | |
|---|---|---|---|---|---|---|---|---|---|---|---|---|---|---|
| | | 1 | 2 | 3 | 4 | 5 | 6 | 7 | 8 | 1 | 2 | 3 | 4 | 5 |
| Composition | Crystallization temperature [° C.] | 52 | 58 | 45 | 60 | 45 | 60 | 64 | 43 | — | 58 | 50 | 80 | 29 |
| | Melting point [° C.] | 122 | 119 | 116 | 126 | 125 | 123 | 124 | 115 | — | 122 | 121 | 122 | 72 |
| Condition 1 | Initial creep [mm] | 5 BA | 0 | 0 | 5 BA | 0 | 0 | 7 BA | 0 | Dropping out BA | Dropping out BA | 0 | Dropping out BA | 10 CF |
| | Initial peel strength [N/25 mm] | 20 FB/BA | 30 FB | 30 FB | 20 FB/BA | 30 FB | 30 FB | 25 FB/BA | 30 FB | — | — | 30 FB | — | 20 CF |
| | Heat creep resistance [mm] | 5 BA | 0 | 5 | 5 BA | 0 | 3 BA | 0 | 8 BA | Dropping out BA | Dropping out BA | Dropping out CF | Dropping out BA | Dropping out CF |
| Condition 2 | Initial creep [mm] | 10 BA | 0 | 5 BA | 5 BA | 0 | 0 | 9 BA | 0 | — | — | 0 | Dropping out BA | 10 CF |
| | Initial peel strength [N/25 mm] | 5 FB/BA | 30 FB | 30 FB | 10 FB/BA | 20 BA | 30 FB | 25 FB/BA | 30 FB | — | — | — | — | 20 CF |
| | Heat creep resistance [mm] | 5 BA | 0 | 0 | 15 BA | 5 BA | 3 BA | 0 | 9 BA | — | — | Dropping out CF | Dropping out BA | Dropping out CF |

BA: Interfacial failure on the substrate side
FB: Material failure of the surface material
CF: Cohesive failure of the adhesive

[Acid-Modified Polymer 1]
Acid-modified PBE 120: maleic acid-modified propylene/1-butene/ethylene copolymer, melting point: 120° C., crystallization temperature: 80° C., weight average molecular weight: 75000, 1-butene content: about 17% by mass, acid content: 3% by mass

[Acid-Modified Polymer 2]
Acid-modified PB 70: maleic acid-modified propylene/1-butene copolymer, melting point: 70° C., crystallization temperature: 20° C., weight average molecular weight: 65000, 1-butene content: about 26% by mass, maleic acid content: 2% by mass

[Acid-Unmodified Polymer 1]
Acid-unmodified PBE 120: propylene/1-butene/ethylene copolymer, melting point: 120° C., crystallization temperature: 80° C., weight average molecular weight: 70000, 1-butene content: about 18% by mass, acid content: 0% by mass.

[Acid-Unmodified Polymer 2]
Acid-unmodified PB70: propylene/1-butene copolymer, melting point: 70° C., crystallization temperature: 25° C., weight average molecular weight: 68000, 1-butene content: about 26% by mass, maleic acid content: 0% by mass.

[Acid-Unmodified Polymer 3]
Vestoplast (registered trademark) 520, softening point: 87° C., 1-butene-rich amorphous poly-α-olefin, weight average molecular weight: 63000

[Acid-Unmodified Polymer 4]
Vestoplast (registered trademark) 750, softening point: 107° C., polypropylene-rich amorphous poly-α-olefin, weight average molecular weight: 92000

[Tackifier Resin 1]
Neopolymer 140: petroleum resin-based tackifier, softening point: 145° C., acid value: 0 mgOH/g, weight average molecular weight: 2100, functional group: none

[Tackifier Resin 2]
FK 100: disproportionated rosin type, acid value: 5 or less, softening point: 96 to 102° C.

[Tackifier Resin 3]
Haritack 4821: rosin-modified maleic acid, acid value: 15 to 30, softening point: 100 to 115° C.

[Curing agent]
Hydrazide dodecanedioate (DDH), melting point: 190° C.

[Thermoplastic Resin]
Tufprene A, manufactured by Asahi Kasei Corporation, acid-unmodified styrene-containing thermoplastic elastomer (styrene content: about 40%, butadiene content: about 60%)

The invention claimed is:

1. A thermally crosslinkable composition comprising an acid-modified olefin-based polymer A containing 20 to 90% by mass of structural units derived from propylene, 1 to 60% by mass of structural units derived from 1-butene, and 0.1 to 10% by mass of structural units derived from ethylene and having a melting point of 110 to 150° C. and a crystallization temperature of 50 to 90° C., an acid-modified olefin-based polymer B containing 55% to 95% by mass of structural units derived from propylene and having a melting point of 30 to 110° C. and a crystallization temperature of lower than 50° C., a tackifier resin, and a curing agent, wherein the thermally crosslinkable composition has a crystallization temperature of 30 to 70° C.

2. The thermally crosslinkable composition according to claim 1 comprising 30 to 200 parts by mass of the acid-modified olefin-based polymer B based on 100 parts by mass of the acid-modified olefin-based polymer A, and 20 to 200 parts by mass of the tackifier resin and 0.2 to 3 parts by mass of the curing agent based on 100 parts by mass of a total amount of the acid-modified olefin-based polymers A and B.

3. The thermally crosslinkable composition according to claim 1, wherein a content of the tackifier resin having an acid value of 5 or less is 20 to 100% by mass based on 100% by mass of a whole tackifier resin.

4. The thermally crosslinkable composition according to claim 3, wherein the tackifier resin having an acid value of 5 or less is selected from the group consisting of rosin resins, terpene resins and petroleum resins.

5. The thermally crosslinkable composition according to claim 1, wherein the curing agent is a solid polyamine compound having a melting point of 150° C. or higher.

6. The thermally crosslinkable composition according to claim 5, wherein the solid polyamine compound having a melting point of 150° C. or higher is a hydrazide-based polyamine.

7. The thermally crosslinkable composition according to claim 1, further comprising an acid-unmodified thermoplastic resin.

8. The thermally crosslinkable composition according to claim 7, wherein the acid-unmodified thermoplastic resin is an acid-unmodified styrene-containing thermoplastic elastomer.

9. The thermally crosslinkable composition according to claim 1, further comprising a solvent.

10. A hot melt adhesive comprising the thermally crosslinkable composition according to claim 1.

11. A film adhesive comprising the thermally crosslinkable composition according to claim 1.

12. An adhesive for adherent surface material, wherein the adhesive comprises the thermally crosslinkable composition according to claim 1.

13. An adherent surface material comprising the adhesive according to claim 12.

14. An automotive interior component comprising the adherent surface material according to claim 13 and a polyolefin substrate.

15. An architectural interior material comprising the adherent surface material according to claim 13 and the polyolefin substrate.

* * * * *